United States Patent
Echle et al.

(10) Patent No.: US 10,247,225 B2
(45) Date of Patent: Apr. 2, 2019

(54) DEVICE FOR PRODUCING A FUNCTIONAL SHAFT

(71) Applicant: Neumayer Tekfor Engineering GmbH, Hausach (DE)

(72) Inventors: Joachim Echle, Oberwolfach (DE); Christoph Gremmelspacher, Haslach (DE); Markus Schuler, Oberwolfach (DE)

(73) Assignee: Neumayer Tekfor Engineering GmbH, Hausach (DE)

( * ) Notice: Subject to any disclaimer, the term of this patent is extended or adjusted under 35 U.S.C. 154(b) by 338 days.

(21) Appl. No.: 14/997,149

(22) Filed: Jan. 15, 2016

(65) Prior Publication Data

US 2016/0131181 A1 May 12, 2016

Related U.S. Application Data

(60) Division of application No. 13/861,961, filed on Apr. 12, 2013, now Pat. No. 9,273,770, which is a (Continued)

(30) Foreign Application Priority Data

Oct. 12, 2010 (DE) .................. 10 2010 048 225

(51) Int. Cl.
*F16C 3/10* (2006.01)
*G01L 1/16* (2006.01)
(Continued)

(52) U.S. Cl.
CPC ............ *F16C 3/10* (2013.01); *B23P 11/00* (2013.01); *B23P 15/00* (2013.01); *B23P 19/02* (2013.01);
(Continued)

(58) Field of Classification Search
CPC .......... B25B 11/00; B23P 11/00; B23P 15/00; B23P 15/14; B23P 19/02; B23P 2700/02;
(Continued)

(56) References Cited

U.S. PATENT DOCUMENTS

| 3,948,076 A | 4/1976 | Eitel et al. |
| 4,660,269 A | 4/1987 | Suzuki |

(Continued)

FOREIGN PATENT DOCUMENTS

| DE | 198 58 722 A1 | 12/1999 |
| DE | 600 26 425 T2 | 10/2006 |

(Continued)

OTHER PUBLICATIONS

German Search Report with English translation dated Aug. 8, 2011 (eight (8) pages).

*Primary Examiner* — Sarang Afzali
(74) *Attorney, Agent, or Firm* — Crowell & Moring LLP

(57) ABSTRACT

A device for producing a functional shaft and a functional shaft are provided in which a functional element which is provided with a pocket is inserted into a retaining element, a shaft is inserted into the pocket, and a force applied to the functional element while the shaft is being inserted into the pocket is measured.

2 Claims, 2 Drawing Sheets

Related U.S. Application Data continuation of application No. PCT/DE2011/001835, filed on Oct. 11, 2011.

(51) Int. Cl.

| | | |
|---|---|---|
| *B23P 15/00* | (2006.01) | |
| *B23P 19/02* | (2006.01) | |
| *F16C 3/02* | (2006.01) | |
| *F16H 53/02* | (2006.01) | |
| *F01L 1/047* | (2006.01) | |
| *B23P 11/00* | (2006.01) | |
| *B25B 11/00* | (2006.01) | |
| *B23P 15/14* | (2006.01) | |

(52) U.S. Cl.
CPC .............. *B25B 11/00* (2013.01); *F01L 1/047* (2013.01); *F16C 3/023* (2013.01); *F16H 53/025* (2013.01); *G01L 1/16* (2013.01); *B23P 15/14* (2013.01); *B23P 2700/02* (2013.01); *F01L 2001/0471* (2013.01); *F01L 2001/0475* (2013.01); *F01L 2103/00* (2013.01); *F16C 2360/18* (2013.01); *Y10T 29/49293* (2015.01); *Y10T 74/2101* (2015.01)

(58) Field of Classification Search
CPC . B23Q 3/00; B23Q 17/005; F16C 3/10; F16C 3/023; F16C 2360/18; F01L 2001/0475; F01L 2103/00; F01L 2001/0471; F16H 53/025; G01L 1/16; G01L 1/162–1/167; Y10T 29/49293; Y10T 29/49826; Y10T 29/49776; Y10T 74/2101
USPC ........................................................ 72/21.4
See application file for complete search history.

(56) References Cited

U.S. PATENT DOCUMENTS

| | | |
|---|---|---|
| 4,774,852 A | 10/1988 | Matt |
| 5,038,450 A | 8/1991 | Swars |
| 5,054,182 A | 10/1991 | Riemscheid et al. |
| 5,287,615 A | 2/1994 | Swars |
| 5,299,881 A | 4/1994 | Mettler-Friedli |
| 5,343,618 A | 9/1994 | Arnold et al. |
| 5,419,217 A | 5/1995 | Umezawa et al. |
| 6,012,216 A * | 1/2000 | Esteves ............ A61B 17/06004 29/564.7 |
| 6,189,194 B1 | 2/2001 | Kuhl |
| 6,324,902 B1 | 12/2001 | Kang |
| 6,332,256 B1 | 12/2001 | Dawson |
| 6,804,884 B1 | 10/2004 | Vogel |
| 8,844,130 B2 | 9/2014 | Scherzinger et al. |
| 2003/0033901 A1 | 2/2003 | Sugaya et al. |
| 2003/0230260 A1 | 12/2003 | Takano et al. |
| 2004/0216553 A1 | 11/2004 | Kirmsse |
| 2008/0276753 A1 | 11/2008 | Takamura |
| 2010/0132640 A1 | 6/2010 | Methley et al. |
| 2010/0224145 A1 | 9/2010 | Mueller |
| 2010/0224146 A1 | 9/2010 | Kuwahara et al. |
| 2013/0125699 A1 | 5/2013 | Bechtold |
| 2013/0133474 A1 | 5/2013 | Grunwald |
| 2013/0305532 A1 | 11/2013 | Demuth et al. |

FOREIGN PATENT DOCUMENTS

| | | |
|---|---|---|
| DE | 10 2007 056 769 A1 | 6/2008 |
| DE | 10 2007 056 638 A1 | 5/2009 |
| EP | 1 155 770 A2 | 11/2001 |
| WO | WO 01/12956 A1 | 2/2001 |

\* cited by examiner

DEVICE FOR PRODUCING A FUNCTIONAL SHAFT

CROSS REFERENCE TO RELATED APPLICATIONS

This application is a divisional of U.S. application Ser. No. 13/861,961, filed Apr. 12, 2013, which is a continuation of PCT International Application No. PCT/DE2011/001835, filed Oct. 11, 2011, which claims priority from German Patent Application No. 10 2010 048 225.0, filed Oct. 12, 2010, the entire disclosures of which are herein expressly incorporated by reference.

BACKGROUND AND SUMMARY OF THE INVENTION

The invention relates to a method for producing a functional shaft. Furthermore, the invention relates to a device for producing a functional shaft and to a functional shaft produced accordingly. One example of a functional shaft is a camshaft. However, it can also involve other shafts, for example, gearwheels.

A camshaft has at least one carrier element, also called a tube or a shaft, and at least one cam. When camshafts are used in engines, these camshafts serve as a part of the valve timing mechanism, and in this case the carrier element rotates about its longitudinal axis. The cams convert the rotary motion into longitudinal motions, thereby controlling the intake valves and the exhaust valves of the engine. A large number of design variants of camshafts, their components or the manufacturing method thereof are already known from the prior art. For example, WO 01/12956 A1 describes an assembled camshaft, wherein the cams and other functional elements are produced separately and then are slid individually onto the shaft. The patent documents DE 10 2007 056 638 A1 and EP 1 155 770 A2 describe that a plurality of functional elements are arranged one after the other and that the shaft is passed through the pockets of the functional elements.

The object of the present invention is to provide a method that is intended for producing functional shafts and that is as effective and reliable as possible.

The invention achieves this engineering object by a method comprising at least the following steps: that at least one functional element, which is provided with at least one pocket, is inserted into a retaining element, in particular, at a predeterminable angular position; that at least one shaft is inserted into the pocket of at least one functional element; and that at least one force, which is applied to the at least one functional element while the shaft is being inserted into the pocket, is measured. The measurement of the force, which acts on the functional element, can occur, for example, indirectly in that the force that acts on the retaining element is measured. In one design variant at least one joining means is inserted between the shaft and the functional elements, when and/or before the shaft is being inserted into the pockets of the functional elements.

One embodiment of the method provides that at least two functional elements, each of which is provided with at least one pocket, are inserted axially one after the other into a holding element, in particular, at a predeterminable angular position and/or, in particular, at a predeterminable axial distance relative to each other; that the shaft is inserted into the pockets of the functional elements; and that at least the force, which is applied to at least one functional element while the shaft is being inserted into the pockets of the functional elements, is measured. In this embodiment the method is simplified by the fact that many functional elements are applied all at once to the shaft. The shaft is assembled, for example, until it hits the end stop. That is, the shaft is inserted, for example, until it reaches a stop face. In one embodiment all of the functional elements are applied to the shaft in one working step. The joining is monitored with the force measurement. In this case the angular position relates to the radial orientation of the functional elements.

One embodiment of the method comprises that the force is measured in shunt mode by measuring the force that is applied to a retaining element.

One embodiment of the method according to the invention provides that the measured force is compared with at least one desired value. The measured values are compared with the specified desired values with or without observing the specified tolerance ranges. This arrangement makes it possible to make statements about the quality of the assembled shaft or more specifically to improve the joining process.

One embodiment of the method comprises that the torque is determined based on the measured force, and this torque can be at least transmitted by the shaft and the respective functional element. For this purpose it is possible to use the reference measurements that have been stored. Furthermore, if desired, the data about the outer diameter of the shaft and the diameter of the pockets of the functional elements can also be used.

One embodiment of the method according to the invention comprises that a camshaft is produced as the functional shaft.

Furthermore, the invention achieves the engineering objective by a device that is configured for producing a functional shaft and that is characterized in that at least one retaining element is provided for holding at least one functional element; and that a force measuring unit is provided for measuring a force that acts on the functional element and/or the retaining element from the shaft. In this case the device serves, for example, to implement the above described method according to at least one of the said embodiments.

One embodiment of the device comprises that the force measuring unit has at least one piezoelectric element. As an alternative or in addition, a strain gauge is provided.

Furthermore, the invention relates to a functional shaft that is produced according to one of the above described embodiments of the method according to the invention and/or in the above described device for producing a functional shaft. The functional shaft involves, for example, a camshaft for a vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
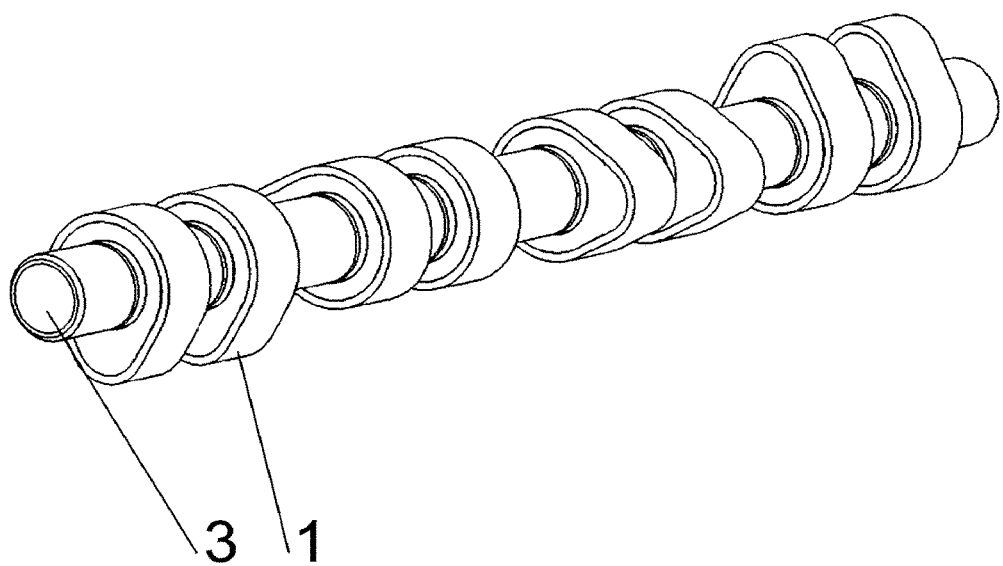
FIG. 1 shows a camshaft in accordance with an embodiment of the present invention.

In FIG. 1 a camshaft is shown as one example of a functional shaft. In this case the separately produced cams are applied to the shaft 3 as examples of the functional elements 1 at differing angular positions (as can be recognized by the tips that differ in the radial orientation). Additional functional elements 1 can be, for example, bearings or gearwheels. In this context the axial arrangement of the functional elements 1 during production relates, for example, to the longitudinal axis of the shaft 3.

Figure 2:
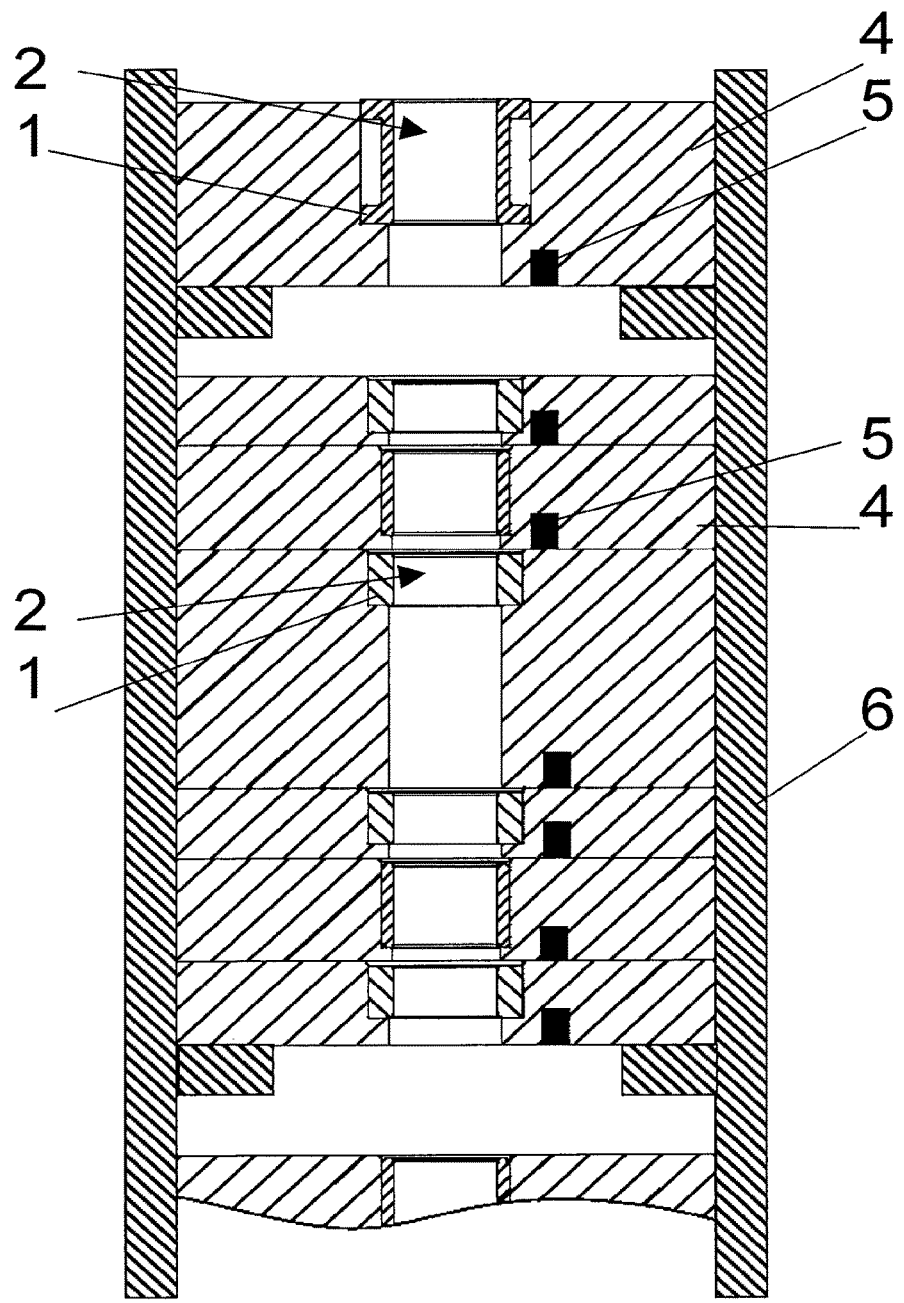
FIG. 2 is a sectional view of a schematic drawing of a retaining unit in accordance with an embodiment of the present invention.

FIG. 2 shows in schematic form a device for producing functional elements. The functional elements 1 (at least two, preferably all, functional elements that are applied to the shaft with the method according to the invention) are inserted into the retaining elements 4, which are mounted in a frame 6 in such a way that the axial distance and the angular position are fixed at the same time. The functional elements 1 involve, for example, cams or bearings. In this case the pockets 2 of the functional elements 1 are arranged in such a way that they are aligned one after the other. The functional elements 1 are connected to the shaft in that the shaft is passed through the pockets. The force, which acts on the functional elements 2 or rather on the retaining elements 4 from the shaft, is measured by means of the force measuring units 5. In an additional embodiment at least one retaining element 4 is provided with more than one force measuring unit 5. Then the measured values are stored, for example, and/or compared with the desired values. Then, for example, based on the stored data, which establish the relation between the generated force and the resulting minimum torque that can be transmitted, and, if desired, as a function of the geometry of the shaft (for example, the outer diameter) and the functional elements (for example, the diameter of the pockets), it is also possible to draw conclusions about the torque, which can be transmitted at least by the shaft and the functional element. This value should correspond to at least the minimum torque, which has to be transmitted by the shaft or more specifically by the cams as the functional elements. Furthermore, the plurality of force measuring units 5, which measure independently of each other, also permit a dynamic measurement of a force/travel characteristic. This approach makes it also possible to observe, for example, the effect that the functional elements, into the pockets of which the shaft is inserted earlier, are subject to a higher load than the functional elements, into the pockets of which the shaft is inserted later or not until the end.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for producing a functional shaft, comprising:
   at least two retaining elements, each of the at least two retaining elements being
      configured to hold a respective one of at least two functional elements at a respective predetermined angular position, and
      located axially one after the other at a predetermined axial distance relative to each other; and
   a force measuring unit,
   wherein
      each of the at least two functional elements has a pocket configured to receive a shaft, and
      the force measuring unit is configured to independently measure forces applied to the at least two retaining elements and the respective ones of the at least two functional elements held on the at least two retaining elements during axial insertion of a shaft into the pockets of the at least two functional elements, each of the applied forces being useable to determine a value of a torque which the inserted shaft and the respective functional element is capable of withstanding without relative motion between the inserted shaft and the respective functional element.

2. The device claimed in claim 1, wherein
the force measuring unit has at least one piezoelectric element.

* * * * *